United States Patent
Hayashi

(10) Patent No.: US 8,891,129 B2
(45) Date of Patent: Nov. 18, 2014

(54) IMAGE FORMING APPARATUS HAVING REAL-SIZE PREVIEW FUNCTION, METHOD OF CONTROLLING THE SAME, AND STORAGE MEDIUM

(71) Applicant: Canon Kabushiki Kaisha, Tokyo (JP)

(72) Inventor: Tomonori Hayashi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/661,480

(22) Filed: Oct. 26, 2012

(65) Prior Publication Data

US 2013/0107284 A1    May 2, 2013

(30) Foreign Application Priority Data

Oct. 27, 2011    (JP) .................................. 2011-235878

(51) Int. Cl.
| | |
|---|---|
| H04N 1/60 | (2006.01) |
| G06K 15/02 | (2006.01) |
| H04N 1/04 | (2006.01) |
| H04N 1/00 | (2006.01) |
| H04N 1/387 | (2006.01) |
| G06K 15/00 | (2006.01) |

(52) U.S. Cl.
CPC ............. *G06K 15/00* (2013.01); *H04N 1/0044* (2013.01); *H04N 1/00411* (2013.01); *H04N 1/387* (2013.01); *H04N 2201/0094* (2013.01); *H04N 1/00474* (2013.01)

USPC .............. 358/1.9; 358/1.2; 358/474; 715/274

(58) Field of Classification Search
None
See application file for complete search history.

(56) References Cited

U.S. PATENT DOCUMENTS

| | | | |
|---|---|---|---|
| 2005/0206916 A1* | 9/2005 | Nakagiri et al. | 358/1.2 |
| 2008/0252943 A1* | 10/2008 | Kozakura et al. | 358/474 |
| 2012/0140279 A1* | 6/2012 | Takasaki et al. | 358/1.15 |

FOREIGN PATENT DOCUMENTS

JP    2001-166763 A    6/2001

* cited by examiner

*Primary Examiner* — Thomas Lett
(74) *Attorney, Agent, or Firm* — Rossi, Kimms & McDowell LLP

(57) ABSTRACT

An image forming apparatus that enables prevention of a print error of different sizes of characters and graphics from those intended by the user, during execution of printing involving magnification, such as aggregation printing. When performing the image formation, a controller unit determines whether or not a processing instruction instructing execution of predetermined processing on the image data has been given. When it is determined that the predetermined processing instruction has been given, the controller unit displays an image to be formed on the recording sheet in the same size as when printed thereon, as a real-size preview image, before executing the image formation on the recording sheet according to image data on which the predetermined processing has been performed.

9 Claims, 9 Drawing Sheets

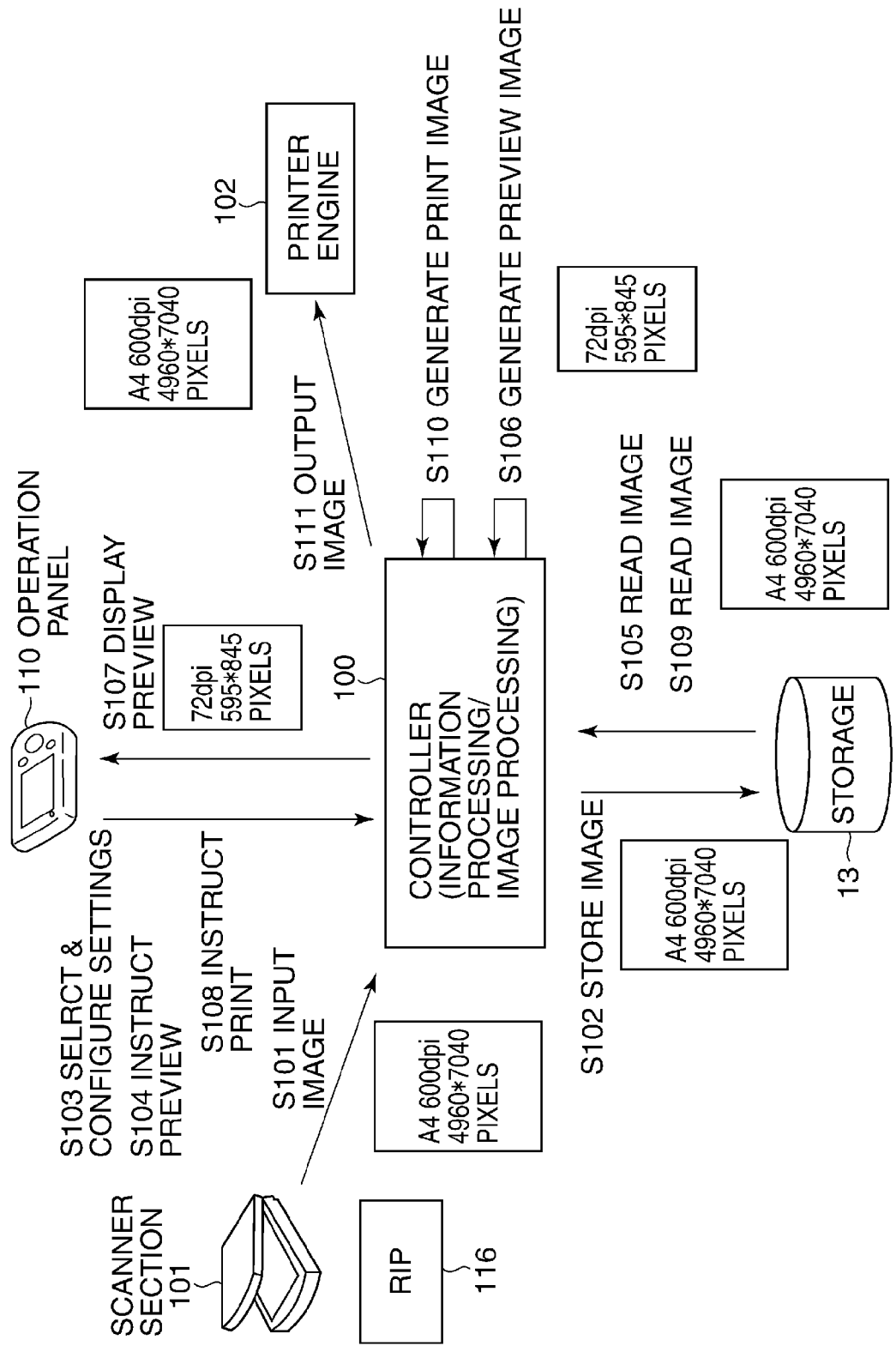

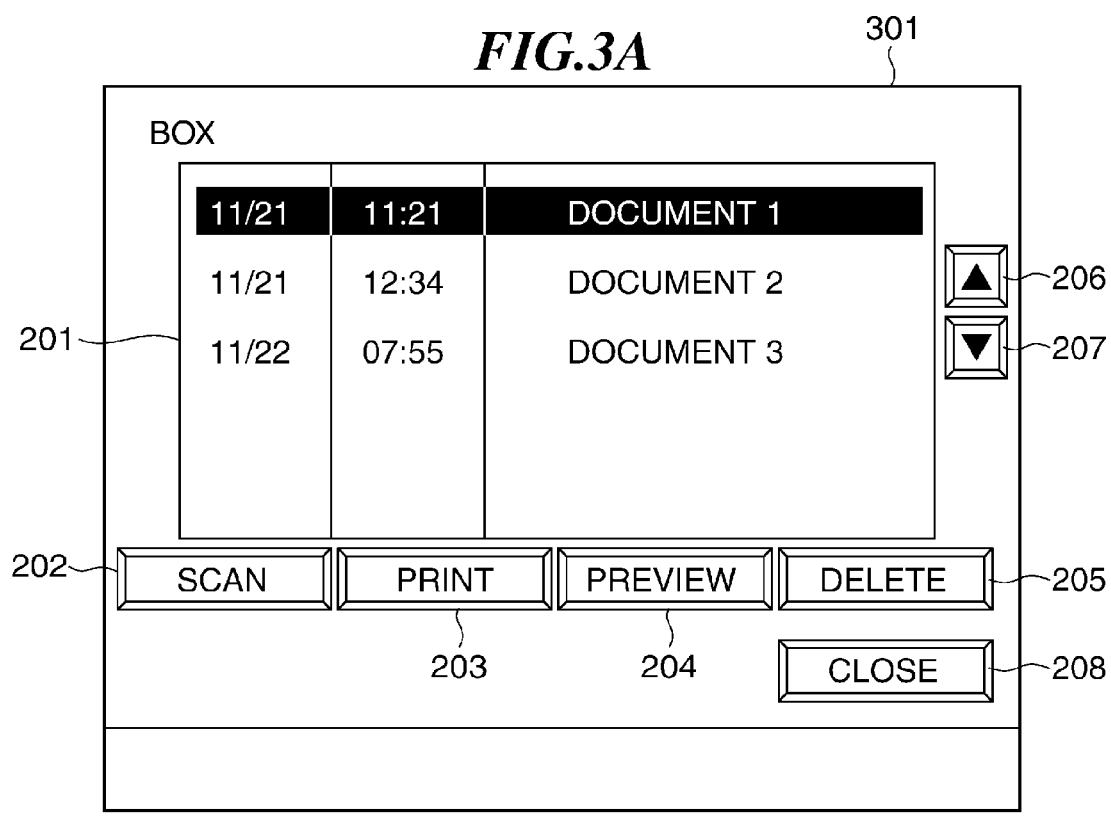
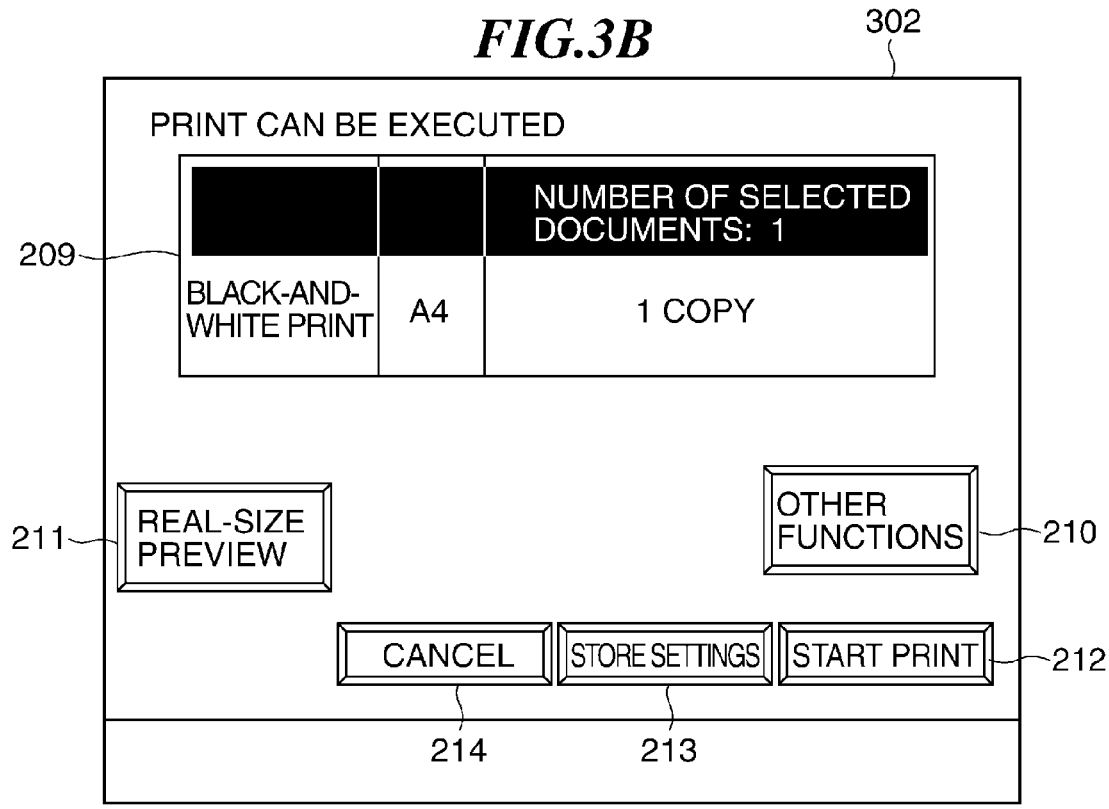

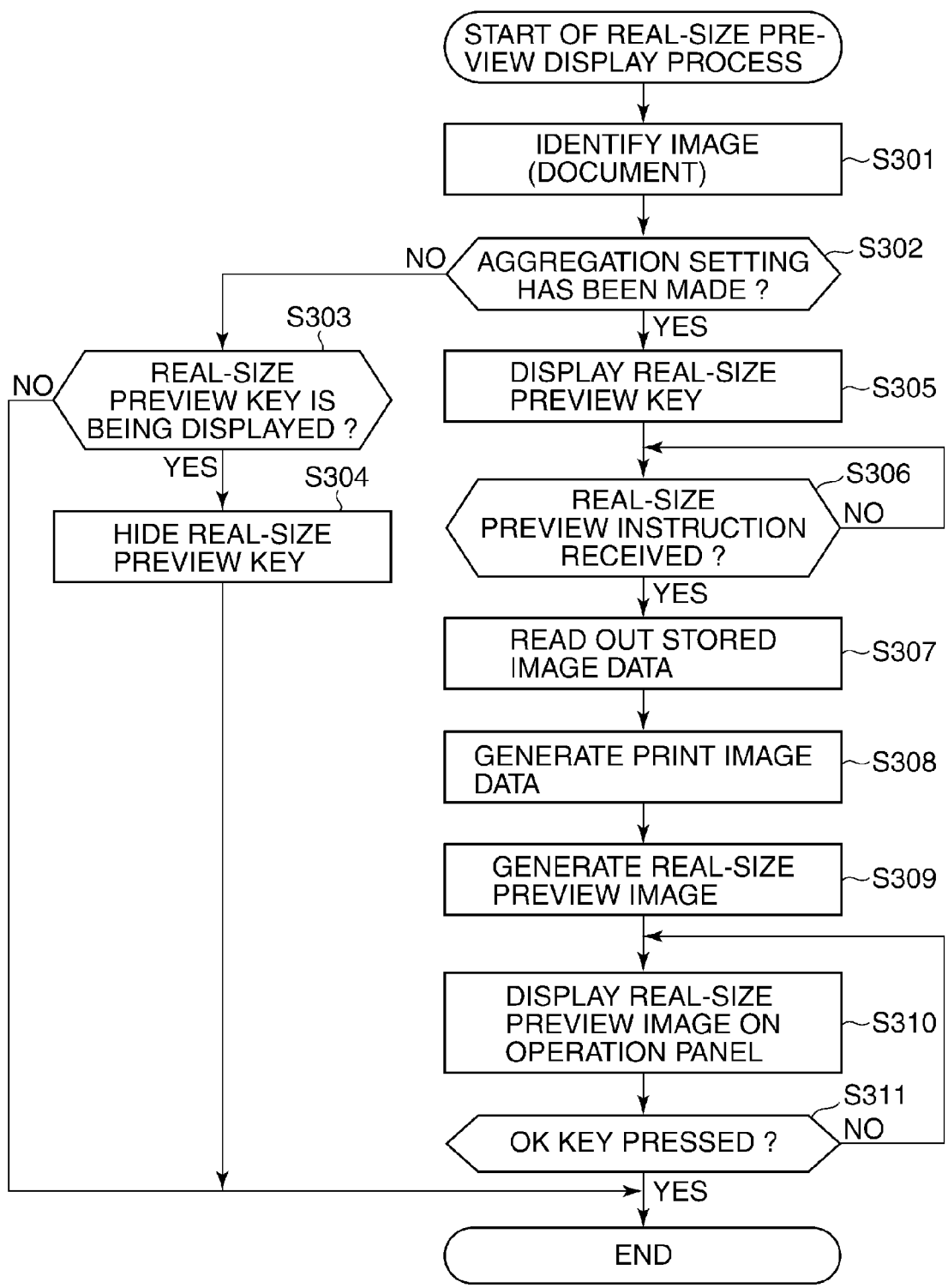

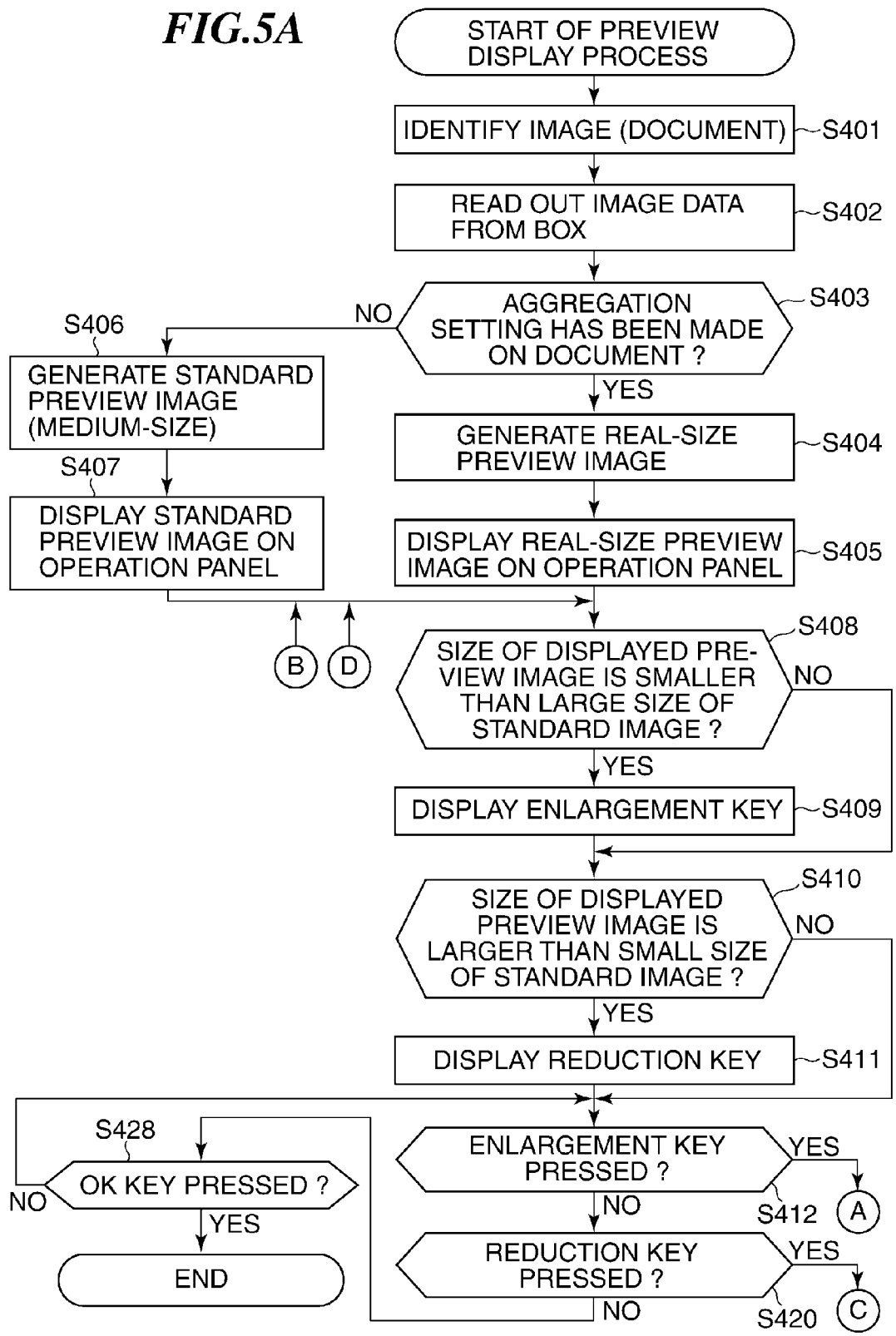

IMAGE FORMING APPARATUS HAVING REAL-SIZE PREVIEW FUNCTION, METHOD OF CONTROLLING THE SAME, AND STORAGE MEDIUM

BACKGROUND OF THE INVENTION

1. Field of the Invention

The present invention relates to an image forming apparatus, such as a printer, a facsimile machine, or a multifunction peripheral, a method of controlling the same, and a storage medium, and more particularly to a preview function of the image forming apparatus.

2. Description of the Related Art

In recent years, from an environmental viewpoint, paperless work has been promoted e.g. in offices. For this reason, an image forming apparatus, such as a multifunction peripheral, is equipped with a preview function so as to reduce print errors even when minimum necessary sheets are printed.

For such a preview function, there has been proposed a technique for displaying characters and graphics included in an image to be printed on a display section in the same size as when the image is printed on a sheet, so as to enable the user to check the image size before printing (see e.g. Japanese Patent Laid-Open Publication No. 2001-166763). This preview will be hereinafter referred to as "real-size preview".

The real-size preview described in the above-mentioned Japanese Patent Laid-Open Publication No. 2001-166763 makes it possible to check the size of characters and graphics before printing, and hence it is possible to prevent occurrence of a print error of different sizes of characters and graphics from those intended by the user, which used to be recognized after printing.

On the other hand, the image forming apparatus is capable of setting so-called aggregation printing in which a plurality of pages are collectively printed by combining the pages into a single page, so as to save sheets and toner. When aggregation printing is executed, the page size is reduced from the size before aggregation. Therefore, to check the sizes of characters and the like to be printed on a sheet by aggregation printing in advance, it is necessary to perform real-size preview of an image in the same size as printed on a sheet by aggregation printing, i.e. in the size of characters and graphics after aggregation.

As mentioned above, a print error of different sizes of characters and graphics from those intended by the user is often caused by print settings made by the user. Therefore, it is effective to additionally execute the above-mentioned real-size preview, when a print setting is made which involves changing the sizes of printed characters and graphics from the sizes of the same on an original as in the case of the above-mentioned aggregation printing.

However, there is a problem that the user often fails to recognize a change in the size of characters caused by the print settings.

SUMMARY OF THE INVENTION

The present invention solves the above-mentioned problem, and makes it possible to prevent occurrence of a print error of different sizes of characters and graphics from those intended by the user, during execution of magnification printing, such as aggregation printing.

In a first aspect of the present invention, there is provided an image forming apparatus that performs image formation on a recording sheet according to image data, comprising a determination unit configured to, when performing the image formation, determine whether or not a processing instruction instructing execution of predetermined processing on the image data has been given, and a preview display control unit configured to, when it is determined by the determination unit that the predetermined processing instruction has been given, display an image to be formed on the recording sheet in the same size as when printed thereon, as a real-size preview image, before executing the image formation on the recording sheet according to image data on which the predetermined processing has been performed.

In a second aspect of the present invention, there is provided a method of controlling an image forming apparatus that performs image formation on a recording sheet according to image data, comprising determining, when performing the image formation, whether or not a processing instruction instructing execution of predetermined processing on the image data has been given, and displaying, when it is determined that the predetermined processing instruction has been given, an image to be formed on the recording sheet in the same size as when printed thereon, as a real-size preview image, on a display section, before executing the image formation on the recording sheet according to image data on which the predetermined processing has been performed.

In a third aspect of the present invention, there is provided a non-transitory computer-readable storage medium storing a computer-executable program for causing a computer to execute a method of controlling an image forming apparatus that performs image formation on a recording sheet according to image data, wherein the method comprises determining, when performing the image formation, whether or not a processing instruction instructing execution of predetermined processing on the image data has been given, and displaying, when it is determined by the determining that the predetermined processing instruction has been given, an image to be formed on the recording sheet in the same size as when printed thereon, as a real-size preview image, on a display section, before executing the image formation on the recording sheet according to image data on which the predetermined processing has been performed.

According to the present invention, it is possible to prevent occurrence of a print error of different sizes of characters and graphics from those intended by the user during execution of magnification printing, such as aggregation printing.

Further features of the present invention will become apparent from the following description of exemplary embodiments with reference to the attached drawings.

BRIEF DESCRIPTION OF THE DRAWINGS

FIG. 2 is a diagram useful in explaining processes for preview display and print, executed by the image forming apparatus shown in FIG. 1.

FIGS. 3A and 3B are views useful in explaining a display screen displayed on an operation panel appearing in FIG. 2, in which FIG. 3A shows a selection screen (box data selection screen) for selecting image data stored in a storage appearing in FIG. 2, and FIG. 3B shows a print execution screen.

FIG. 4 is a flowchart of a real-size preview display process executed by the image forming apparatus when a print key is pressed on the selection screen.

FIG. 5A is a flowchart of a preview display process executed when a preview key has been pressed on the box data selection screen of the image forming apparatus.

FIGS. 6A and 6B are views each showing a preview image display screen displayed on the operation panel when the preview key appearing in FIG. 3A has been pressed, in which FIG. 6A shows an example of the preview image display screen, and FIG. 6B shows another example of the preview image display screen.

DESCRIPTION OF THE EMBODIMENTS

The present invention will now be described in detail below with reference to the accompanying drawings showing embodiments thereof.

Figure 1:
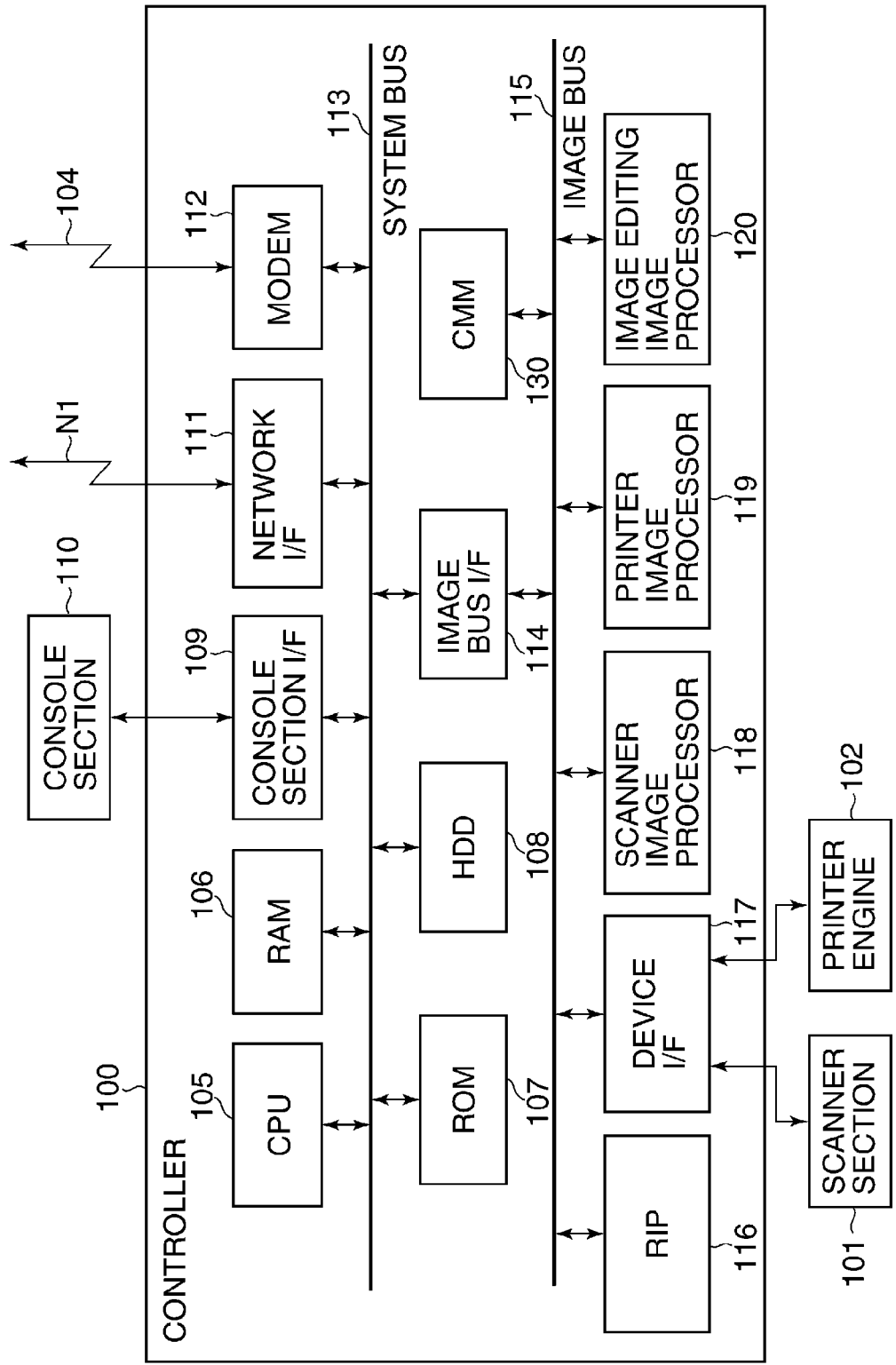
FIG. 1 is a block diagram of the hardware configuration of an example of an image forming apparatus according to an embodiment of the present invention.

FIG. 1 is a block diagram of the hardware configuration of an image forming apparatus according to an embodiment of the present invention.

The illustrated image forming apparatus is a so-called multifunction peripheral (MFP), and comprises a controller unit 100, a scanner section 101, a printer engine 102, and a console section (also referred to as the operation panel) 110.

The scanner section 101 irradiates an original set on an original platen glass (not shown) with light to optically read an image on the original under the control of the controller unit 100. Then, the scanner section 101 converts the optical image to an electric signal, and obtains image data. The printer engine 102 forms an image on a sheet according to image data under the control of the controller unit 100. The operation panel 110 is used for inputting various commands and the print settings to the controller unit 100. Further, on the operation panel 110, a setting screen and various kinds of information are displayed, as described hereinafter.

The controller unit 100 includes a CPU (central processing unit) 105, which controls the overall operation of the MFP. A RAM (random access memory) 106 is used as a system work memory for the CPU 105. The RAM 106 also functions as an image memory for temporarily storing image data. A ROM (read only memory) 107 is a boot ROM that stores a boot program. A hard disk drive (HDD) 108 stores system software used for various processing, input image data, and so forth.

A console section interface 109 provides interface with the operation panel 110, and outputs operation screen data to the operation panel 110. Further, the console section interface 109 also outputs information input by a user via the operation panel 110 to the CPU 105.

A network interface 111 is implemented e.g. as a LAN card, and is connected to the LAN N1 to input and output information (data), such as image data, from and to external apparatuses (e.g. a computer). A modem 112 is connected to a public communication line 104 to input and output information, such as an image, from and to external apparatuses (e.g. a facsimile machine).

Note that the above-mentioned components (devices) are connected to each other via a system bus 113.

As shown in FIG. 1, the controller unit 100 includes an image bus interface 114. The image bus interface 114 provides interface for connecting the system bus 113 and an image bus 115. The image bus 115 is for use in high-speed transfer of image data, and the image bus interface 114 is used as a bus bridge that performs conversion of data format.

Connected to the image bus 115 are a raster image processor (RIP) 116, a device interface 117, a scanner image processor 118, a printer image processor 119, an image editing image processor 120, and a color management module (CMM) 130.

The RIP 116 converts a page description language (PDL data) code or vector data, described hereinafter, into an image. The device interface 117 is connected to the scanner section 101 and the printer engine 102 to perform synchronous-to-asynchronous or asynchronous-to-synchronous conversion of image data.

The scanner image processor 118 performs various kinds of processing, such as correction, manipulation, and editing, of image data input from the scanner section 101. The printer image processor 119 performs correction, resolution conversion, etc. of image data to be printed out, in accordance with the printer engine 102.

The image editing image processor 120 performs various kinds of image processing, such as rotation of image data and compression and expansion of image data. The CMM 130 is a dedicated hardware module for performing color conversion (also referred to as "color space conversion") on image data based on a profile or calibration data.

The profile is information including a function for converting color image data expressed by a color space dependent on an apparatus to a color space (e.g. Lab) independent of the apparatus. The calibration data is for correcting color reproduction characteristics of the scanner section 101 and the printer engine 102 in color printing.

FIG. 2 is a diagram useful in explaining processes for preview display and print, executed by the image forming apparatus shown in FIG. 1.

In FIG. 2, a storage area including e.g. the HDD 108, is illustrated outside the controller unit (also simply referred to as the controller) 100, as a storage 13, for convenience of explanation. Further, in FIG. 2, the RIP 116 is illustrated outside the controller 100. That is, in FIG. 2, the components of the controller 100 except the storage 13 and the RIP 116 are collectively illustrated as the controller 100.

When image data is input from the scanner section 101 or the RIP 116 to the controller 100 (S101), the controller 100 (i.e. the CPU 105 appearing in FIG. 1) stores the image data in the storage 13 referred to as the box (storage area) (S102).

When a user selects and configures settings of image data stored in the storage 13 using the operation panel 110 (S103), and gives a preview instruction (S104), the controller 100 reads out the selected image data from the storage 13 (S105), and generates a preview image according to the preview instruction (S106). Then, the controller 100 displays the preview image on the operation panel 110 (S107).

On the other hand, when the user selects image data stored in the storage 13, and gives a print instruction (S108) using the operation panel 110, the controller 100 reads out the selected image data from the storage 13 (S109), and generates print image data (S110). Then, the controller 100 sends the print image data to the printer engine 102 (S111).

Now, the real-size preview displayed on the operation panel 110 will be described.

The term "real-size preview" is intended to mean a preview of an image as a target of the real-size preview on the operation panel 110 in the same size as that of the target image to be assumed when printed on a sheet (recording sheet) (this size is referred to as the real size). In other words, assuming that a preview image displayed for real-size preview and an image output on a recording sheet are placed one over the other, they will perfectly overlap each other to show that they are equal in size, i.e. have the same size. Therefore, execution of the real-size preview enables the user to more easily grasp an image of a print product to be output.

In executing the real-size preview, when the user inputs an instruction for displaying a real-size preview using the operation panel 110, the controller 100 (i.e. the CPU 105 appearing in FIG. 1) is notified to that effect (given the real-size preview display instruction).

Upon receipt of the real-size preview display instruction, the controller 100 generates a real-size preview image according to the image data (i.e. selected image data) stored in the storage 13.

Now, when generating the real-size preview image, the controller 100 acquires a display resolution (x) of the operation panel 110, and acquires a print resolution (y) of the printer engine 102. Then, the controller 100 reduces (or enlarges) the image to be printed by the printer engine 102 at a ratio calculated by x/y to thereby generate the real-size preview image.

For example, assuming that the display resolution is 72 dpi, and the print resolution is 600 dpi, the controller 100 reduces the image to be printed at a ratio of 72/600=0.12 (12%) to thereby generate the real-size preview image.

When printing image data on an A4-size sheet, the size of the image data to be printed is 210 mm in width and 297 mm in length. Then, as for the number of pixels of the image data, the number of pixels in a horizontal direction of A4 is equal to 210 mm (width of A4)/(25.4 mm/inch)×600 dpi=4960 pixels. Further, the number of pixels in a vertical direction of A4 is equal to 297 mm (length of A4)/(25.4 mm/inch)×600 dpi=7015 pixels.

Since the image data is reduced at 12%, as for the number of pixels in the real-size preview image, the number of pixels in the horizontal direction of the real-size preview image is equal to 4960 pixels×0.12=596 pixels, and the number of pixels in the vertical direction of the real-size preview image is equal to 7015 pixels×0.12=842 pixels.

The controller 100 generates display data according to the real-size preview image, and displays the generated display data on the operation panel 110 as a display image. As a result, the real-size preview image is displayed on the operation panel 110.

Next, a process for displaying a real-size preview image on the operation panel 110 appearing in FIG. 2 will be described.

FIGS. 3A and 3B are views useful in explaining a display screen displayed on the operation panel 110 appearing in FIG. 2, in which FIG. 3A shows a selection screen 301 (box data selection screen) for selecting image data stored in the storage 13 appearing in FIG. 2, and FIG. 3B shows a print execution screen 302.

When the user gives a selection screen display instruction by operating the operation panel 110, the controller 100 displays the box data selection screen (hereinafter simply referred to as the selection screen) 301 for selecting image data stored in the storage (box) 13 on the operation panel 110.

As shown in FIG. 3A, a list 201 of image data (documents) stored in the box 13 is displayed on the selection screen 301. The list 201 includes the date and time of registration and document name of each document. To select a document, the document name is pressed (touched) e.g. with a finger. By this operation, the touched document is selected and highlighted.

A scan key 202 is used for reading image data from the scanner section 101 and storing the read data into the box 13 currently opened. When the scan key 202 is operated, the controller 100 displays a scan setting screen (not shown) on the operation panel 110.

A print key 203 is used for printing a selected document. When the print key 203 is operated, the controller 100 displays a print execution screen 302 shown in FIG. 3B on the operation panel 110.

A preview key 204 is used for previewing a selected document. A delete key 205 is used for deleting a selected document. A scroll-up key 206 and a scroll-down key 207 are used for scrolling up and down the selection screen 301, respectively, when more documents are registered in the box 13 than the number of documents which can be displayed at a time on the display screen (display section) of the operation panel 110. When a close key 208 is operated, the controller 100 displays a standard screen (not shown) on the operation panel 110.

As mentioned above, by operating the print key 203, the print execution screen 302 shown in FIG. 3B is displayed on the operation panel 110. The print execution screen 302 includes a settings simplified check area 209 in which setting information set for the selected document (color print or black and white print, a sheet size, the number of copies) is displayed.

When an other-function key 210 is operated, the controller 100 displays a detailed print setting screen (not shown) for configuring details of print settings, on the operation panel 110. From the detailed print setting screen, it is possible to set aggregation printing in which a plurality of pages are collectively printed by combining them into one (single) page.

A real-size preview key 211 is displayed on the print execution screen 302 after setting aggregation printing by operating the other-function key 210. When the real-size preview key 211 is operated, the controller 100 displays a preview screen on the operation panel 110, on which a real-size preview image is displayed.

In the illustrated example, as will be described hereinafter, the real-size preview key 211 is automatically displayed for documents on which a print setting involving reduction of character size has been made. This prompts the user to check the image by the real-size preview before printing, to thereby prevent occurrence of a print error of different sizes of characters and graphics from those intended by the user.

A print start key 212 is used for printing a selected document according to currently set print settings. A setting saving key 213 is used for saving the currently set print settings in association with the selected document. When the setting saving key 213 is operated, the print settings are saved, and the controller 100 displays the box data selection screen 301 shown in FIG. 3A on the operation panel 110. When a cancel key 214 is operated, the print settings are cancelled, and the controller 100 displays the box data selection screen 301 shown in FIG. 3A on the operation panel 110.

FIG. 4 is a flowchart of a real-size preview display process executed by the image forming apparatus shown in FIG. 1 when the print key 203 is pressed on the box data selection screen 301 shown in FIG. 3A. Steps in FIG. 4 are executed according to a program which is stored in a memory, such as the ROM 107 or the HDD 108, and is executed by the CPU 105 included in the controller 100 of the image forming apparatus.

First, the controller 100 identifies a document selected on the selection screen 301 shown in FIG. 3A (step S301). Then, the controller 100 determines whether or not predetermined processing has been executed on the print execution screen 302 shown in FIG. 3B (step S302). The following description is given assuming that the predetermined processing in the step S302 is setting of aggregation printing, by way of example.

If the setting of aggregation printing has not been made (NO to the step S302), the controller 100 determines whether or not the real-size preview key 211 is already being displayed (step S303). If the real-size preview key 211 is not being displayed (NO to the step S303), the controller 100 terminates the real-size preview display process. On the other hand, if the real-size preview key 211 is already being displayed (YES to the step S303), the controller 100 hides the real-size preview key 211 (step S304), followed by terminating the real-size preview display process.

If the setting of aggregation printing has been made (YES to the step S302), the controller 100 displays the real-size preview key 211 (preview display key) on the print execution screen 302 (display of the preview key: step S305). Then, the controller 100 determines whether or not a real-size preview instruction has been received, i.e. whether or not the real-size preview key 211 has been operated (step S306). If a real-size preview instruction has not been received (NO to the step S306), the controller 100 waits.

If a real-size preview instruction has been received (YES to the step S306), the controller 100 reads out the image data designated by the real-size preview image instruction, i.e. the selected image data from the box 13 (step S307). Then, the controller 100 generates a print image (image data subjected to the predetermined process) according to the selected image data based on the print settings (step S308).

Next, the controller 100 converts the print image to a real-size preview image according to the real-size preview instruction as described hereinabove (step S309). Then, the controller 100 displays the real-size preview image on the operation panel 110 (execution of preview: step S310).

The controller 100 determines whether or not an OK key 504 (see FIGS. 6A and 6B) for terminating the display of the real-size preview image has been pressed (step S311). If the OK key 504 has not been pressed (NO to the step S311), the controller 100 returns to the step S310, and continues the display of the real-size preview image.

On the other hand, if the OK key 504 has been pressed (YES to the step S311), the controller 100 terminates the real-size preview display process.

In the flowchart shown in FIG. 4, the description has been given of the display of the real-size preview image according to the setting of aggregation printing, as an example of the predetermined processing. However, it is desirable to execute the process for displaying a real-size preview image not only when the setting of aggregation printing has been made, but also when a print setting has been made which involves setting of magnification (i.e. magnification processing), such as poster printing setting, i.e. a print setting which has an effect on the size of an image when the image is printed. Here, the magnification processing is intended to mean processing performed for printing an image by changing magnification of image data. Further, poster printing refers to a process in which an image constituting one page is enlarged and divided into sections and the enlarged sections of the image are printed onto respective sheets of a printable size. The sheets having the sections of the image printed thereon are then pieced together to obtain a single large print result (poster).

Figure 5B:
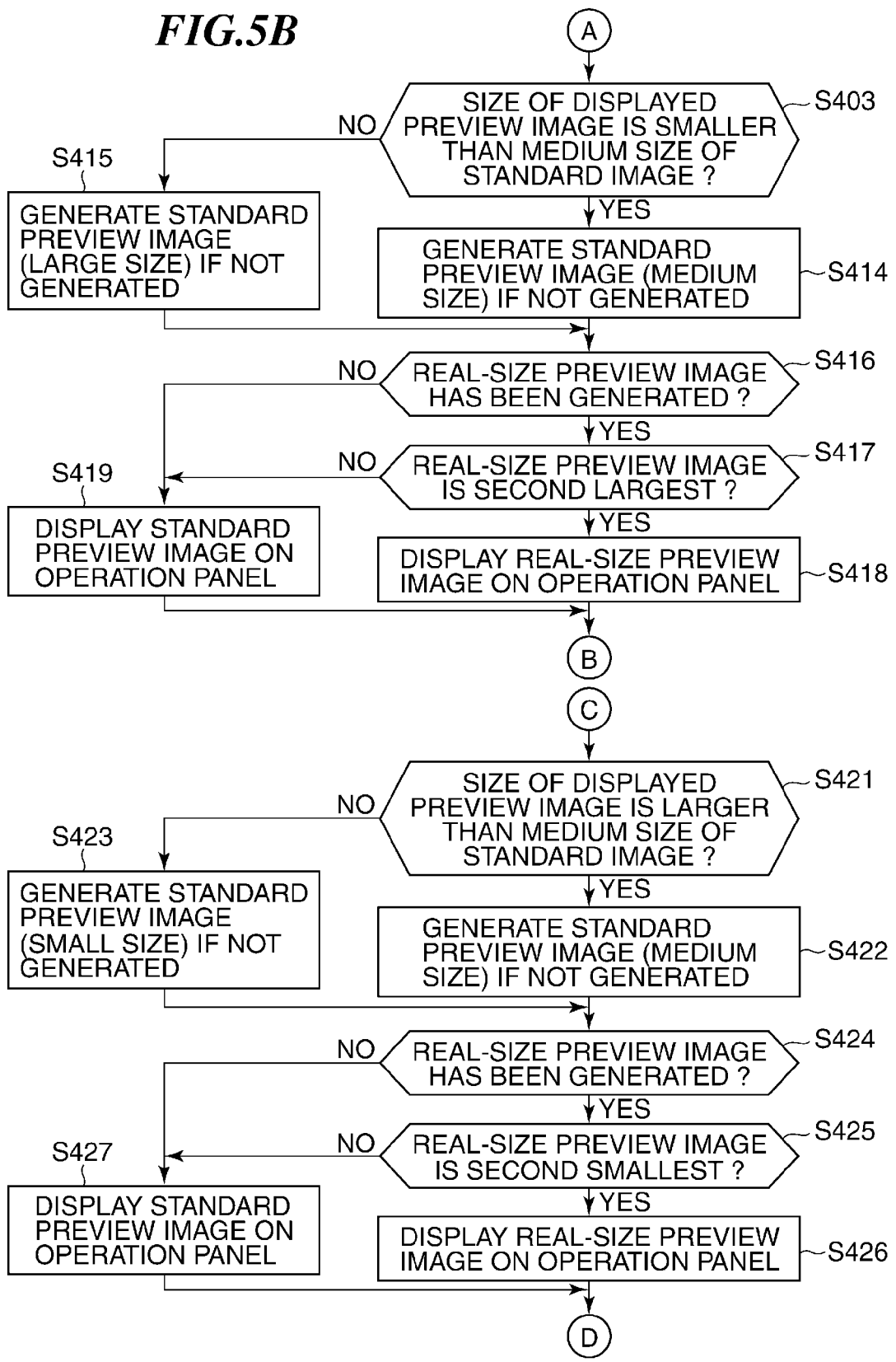
FIG. 5B is a continuation of FIG. 5A.

FIGS. 5A and 5B are a flowchart of a preview display process executed by the image forming apparatus in FIG. 1 when the preview key 204 has been pressed on the box data selection screen 301 shown in FIG. 3A. Steps in FIGS. 5A and 5B are executed according to a program which is stored in a memory, such as the ROM 107 or the HDD 108, and is executed by the CPU 105 included in the controller 100 of the image forming apparatus.

First, the controller 100 identifies a document selected on the selection screen 301 shown in FIG. 3A (step S401). The controller 100 reads out the identified document from the box 13 (step S402).

Next, the controller 100 determines whether or not the setting of aggregation printing has been made on the selected document (step S403). If the setting of aggregation printing has been made (YES to the step S403), the controller 100 generates a real-size preview image according to the preview setting as described hereinabove (step S404). Then, the controller 100 displays the generated real-size preview image on the operation panel 110 (step S405).

On the other hand, if the setting of aggregation printing has not been made (NO to the step S403), the controller 100 generates a standard preview image of the selected document according to the preview setting (step S406). Then, the controller 100 displays the generated standard preview image on the operation panel 110 (step S407).

In the illustrated example, although the standard preview image is displayed in one of small, medium, and large sizes thereof, in an initial state, the standard preview image is displayed in medium size.

After execution of the step S405 or S407, the controller 100 determines whether or not the size of the standard preview image or the real-size preview image displayed on the operation panel 110 is smaller than the large size of the standard image (step S408). Hereinafter, the standard preview image and the real-size preview image are sometimes simply referred to as the preview image.

If the size of the preview image is smaller than the large size of the standard image (YES to the step S408), the controller 100 displays an enlargement key 502 (see FIGS. 6A and 6B) used for enlarging the displayed preview image on the operation panel 110 (display of the enlargement key: step S409). Then, the controller 100 determines whether or not the size of the preview image is larger than the small size of the standard image (step S410). Note that if the size of the preview image is larger than the large size of the standard image (NO to the step S408), the process directly proceeds to the step S410.

If the size of the preview image is larger than the small size of the standard image (YES to the step S410), the controller 100 displays a reduction key 503 (see FIGS. 6A and 6B) used for reducing the size of the displayed preview image on the operation panel 110 (display of the reduction key: step S411). Then, the controller 100 determines whether or not the enlargement key 502 has been pressed (step S412).

On the other hand, if the size of the preview image is not larger than the small size of the standard image (NO to the step S410), the process proceeds to the step S412.

If the enlargement key 502 has been pressed (YES to the step S412), the controller 100 determines whether or not the size the currently displayed preview image is smaller than the medium size of the standard image (step S413). If the size of the preview image is smaller than the medium size of the standard image (YES to the step S413), unless a preview image corresponding to the medium size of the standard image has not been generated in association with the currently displayed preview image, the controller 100 generates a medium-size standard preview image (step S414).

On the other hand, if the size of the preview image is not smaller than the medium size of the standard image (NO to the step S413), unless a preview image corresponding to the large size of the standard image has not been generated in association with the currently displayed preview image, the controller 100 generates a large-size standard preview image (step S415).

After execution of the step S414 or S415, the controller 100 determines whether or not a preview image corresponding to the real-size preview image has been generated in association with the currently displayed preview image (step S416).

If a preview image corresponding to the real-size preview image has been generated (YES to the step S416), the controller 100 determines whether or not the size of the real-size preview image is larger than that of the currently displayed preview image, and is at the same time smaller than that of the standard preview image generated in the step S414 or S415 (step S417). That is, the controller 100 determines whether or not the real-size preview image is second largest in size.

If the real-size preview image is second largest in size (YES to the step S417), the controller 100 displays the real-size preview image on the operation panel 110 (step S418), and returns to the step S408.

On the other hand, if the real-size preview image is not second largest in size (NO to the step S417), the controller 100 displays the standard preview image generated in the step S414 or S415 on the operation panel 110 (step S419), and returns to the step S408.

If it is determined in the step S412 that the enlargement key 502 has not been pressed (NO to the step S412), the controller 100 determines whether or not the reduction key 503 has been pressed (step S420).

If the reduction key 503 has been pressed (YES to the step S420), the controller 100 determines whether or not the size of the currently displayed preview image is larger than the medium size of the standard image in size (step S421). If the currently displayed preview image is larger than the medium size of the standard image (YES to the step S421), unless a preview image corresponding to the medium size of the standard image has not been generated in association with the currently displayed preview image, the controller 100 generates a medium-size standard preview image (step S422).

If the currently displayed preview image is not larger than the medium size of the standard image in size (NO to the step S421), unless a preview image corresponding to the small size of the standard image has not been generated in association with the currently displayed preview image, the controller 100 generates a small-size standard preview image (step S423).

After execution of the step S422 or S423, the controller 100 determines whether or not a preview image corresponding to the real-size preview image has been generated in association with the currently displayed preview image (step S424). If a preview image corresponding to the real-size preview image has been generated (YES to the step S424), the controller 100 determines whether or not the size of the real-size preview image is smaller than that of the currently displayed preview image, and is at the same time larger than that of the standard preview image generated in the step S422 or S423 (step S417). That is, the controller 100 determines whether or not the real-size preview image is second smallest in size.

If the real-size preview image is second smallest in size (YES to the step S425), the controller 100 displays the real-size preview image on the operation panel 110 (step S426), and returns to the step S408.

On the other hand, if the real-size preview image is not second smallest in size (NO to the step S425), the controller 100 displays the standard preview image generated in the step S422 or S423 on the operation panel 110 (step S427), and returns to the step S408.

If the reduction key 503 has not been pressed (NO to the step S420), the controller 100 determines whether or not the OK key 504 for terminating the real-size preview display has been pressed (step S428).

If the OK key 504 has not been pressed (NO to the step S428), the controller 100 returns to the step S412. On the other hand, if the OK key 504 has been pressed (YES to the step S428), the controller 100 closes the preview screen, followed by terminating the present preview display process.

As described above, it is possible to selectively display one of four kinds of preview images, which are standard images (small-size, medium-size, and large-size standard image) displayed by normal preview display, and a real-size preview image, on the operation panel 110 according to the operation of the enlargement key 502 and the reduction key 503.

In the preview display process shown in FIGS. 5A and 5B, the description has been given of the display of the real-size preview image according to the setting of aggregation printing by way of example. However, as mentioned hereinabove, it is desirable to execute the process for displaying a real-size preview image not only when the setting of aggregation printing has been made, but also when a print setting involving setting of magnification, such as poster printing setting, i.e. a print setting which has an effect on the size of an image when the image is printed.

Figure 6A:
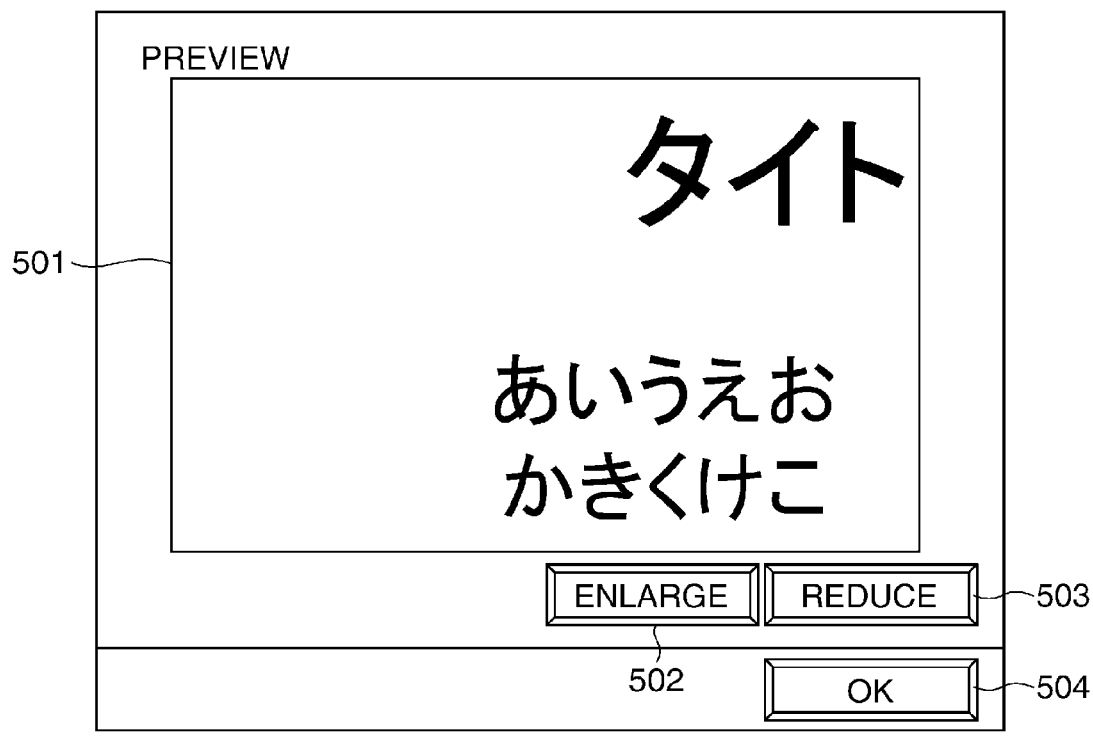
Figure 6B:
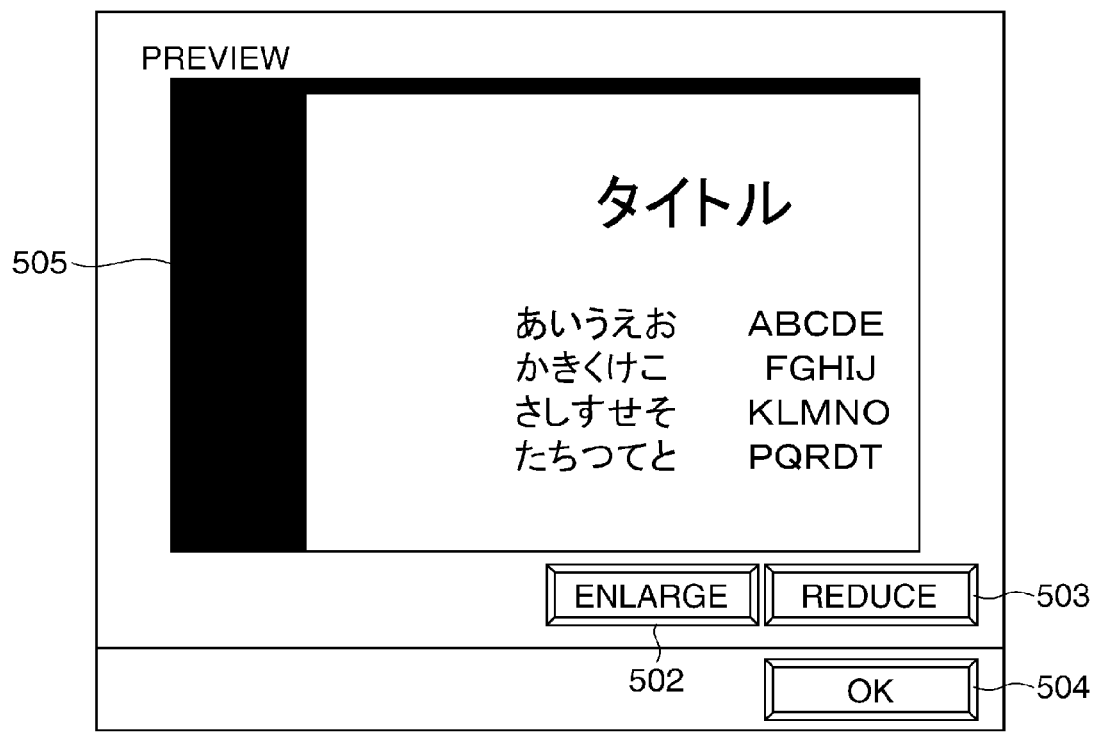

FIGS. 6A and 6B are views each showing a preview image display screen displayed on the operation panel when the preview key 204 appearing in FIG. 3A has been pressed, in which FIG. 6A shows an example of the preview image display screen, and FIG. 6B shows another example of the preview image.

A preview window 501 is displayed in the preview image display screen displayed on the operation panel 110. In the illustrated example, the preview window 501 displays a real-size preview image. Now, when the enlargement key 502 on the preview image display screen is pressed, a preview image larger than the currently displayed preview image in size is displayed on the preview window 501 (see FIG. 6A).

On the other hand, if the reduction key 503 on the preview image display screen is pressed, a preview image smaller than the currently displayed preview image in size is displayed on a preview window 505 (see FIG. 6B).

As described as to the preview display process shown in FIGS. 5A and 5B, in the present embodiment, it is possible to display preview images in respective four different sizes, i.e. small-size, medium-size, and large-size standard images and a real-size preview image.

Therefore, in a state where a medium-size standard preview image is displayed, if the enlargement key 502 is pressed, a large-size standard preview image, or a real-size preview image larger than the medium-size standard preview image and smaller than the large-size standard preview image, provided that it exists, is displayed on the preview window 501. If the OK key 504 is pressed, the preview image display is terminated as mentioned hereinabove.

Figure 7:
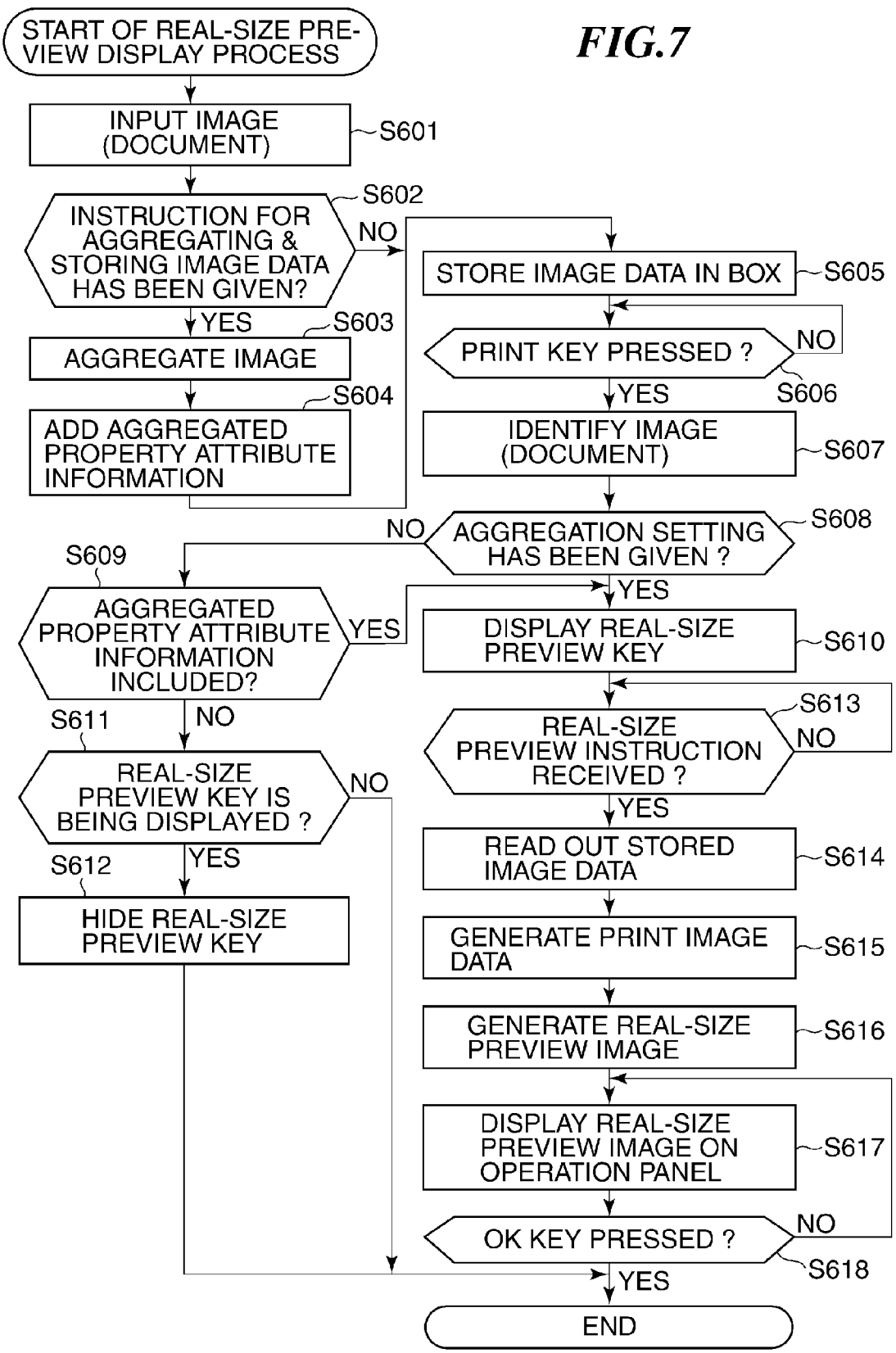
FIG. 7 is a flowchart of a variation of the real-size preview display process which is executed by the image forming apparatus when aggregated image data is stored in a box and displayed for preview.

FIG. 7 a flowchart of a variation of the real-size preview display process described hereinbefore with reference to FIG. 4. This variation is executed by the image forming apparatus shown in FIG. 1, when executing printing of image data after storing the same in the box 13. Steps in FIG. 7 are executed according to a program which is stored in the memory, such as the ROM 107 or the HDD 108, and is executed by the CPU 105 included in the controller 100 of the image forming apparatus.

If aggregation processing is designated for a box storage process for storing image data in the box 13, the controller 100 aggregates image data (e.g. a document) which is obtained by reading originals using the scanner section 101 or by rasterizing page description language (PDL data) code into images using the RIP 116, and stores the aggregated image data in the box 13. Here, the term "aggregation" is intended to mean collecting a plurality of pages of image data into a single page. Note that in the aforementioned aggregation printing setting, aggregation of a plurality of pages into a single page is executed not when storing aggregated image data into the box 13, but when printing the plurality of pages.

Now, by storing such aggregated image data in the box 13, it is possible, when printing the image data (e.g. a document)

at a later date, to generate the same print product as generated by setting aggregation printing, only by reading out the aggregated image data from the box 13 without setting aggregation printing before printing.

In the present process, in the first place, image data (e.g. a document) is input which is obtained by reading originals using the scanner section 101 or by rasterizing page description language (PDL data) code into images using the RIP 116 (step S601). The controller 100 determines whether or not an instruction for aggregating and storing the image data (aggregation storage instruction) has been received from the operation panel 110 (step S602).

If the aggregation storage instruction has been received (YES to the step S602), the controller 100 aggregates the image data according to the aggregation storage instruction into aggregated image data (step S603).

In this case, however, if in the preview display performed by pressing the preview key 204 in FIG. 3A or the real-size preview key 211 in FIG. 3B, processing concerning the real size preview is executed only according to the setting of aggregation printing, the real-size preview display of the aggregated image data becomes unavailable. To eliminate this inconvenience, the controller 100 adds, to the image data, information (aggregated property attribute information) indicating that the image data is aggregated image data (step S604). Then, the controller 100 stores the aggregated image data (processed image data having the aggregated property attribute information added thereto) in the box 13 (step S605). Note that upon storage of image data in the box 13, the box data selection screen 301 shown in FIG. 3A is displayed on the operation panel 110.

If the aggregation storage instruction has not been received (NO to the step S602), the controller 100 directly proceeds to the step S605, and stores the image data in the box 13.

Next, the controller 100 determines whether or not the print key 203 has been pressed on the box data selection screen 301 displayed on the operation panel 110 (step S606). If the print key 203 has not been pressed (NO to the step S606), the controller 100 waits.

If the print key 203 has been pressed (YES to the step S606), the controller 100 identifies image data (e.g. a document) selected on the box data selection screen 301 (step S607).

Next, the controller 100 determines whether or not the setting of aggregation printing has been made (step S608). If the setting of aggregation printing has not been made (NO to the step S608), the controller 100 determines whether or not the image data identified in the step S607 includes aggregated property attribute information indicating that the image data is aggregated image data (step S609). On the other hand, if the setting of aggregation printing has been made (YES to the step S608), the controller 100 displays the real-size preview key 211 on the FIG. 3B print execution screen 302 displayed on the operation panel 110 (step S610).

If the image data includes the aggregated property attribute information (YES to the step S609), the controller 100 proceeds to the step S610, and displays the real-size preview key 211 on the print execution screen 302.

On the other hand, if the image data does not include the aggregated property attribute information (NO to the step S609), the controller 100 determines whether or not the real-size preview key 211 is already being displayed on the print execution screen 302 (step S611). If the real-size preview key 211 is already being displayed (YES to the step S611), the controller 100 hides the real-size preview key 211 (step S612), followed by terminating the present process. On the other hand, if the real-size preview key 211 is not being displayed (NO to the step S611), the controller 100 immediately terminates the present process.

After execution of the step S610, the controller 100 determines whether or not a real-size preview instruction has been received, i.e. whether or not the real-size preview key 211 has been pressed (step S613).

If a real-size preview instruction has not been received (NO to the step S613), the controller 100 waits. On the other hand, if a real-size preview instruction has been received (YES to the step S613), the controller 100 reads out the image data designated by the real-size preview instruction, i.e. the image data which was selected on the box data selection screen 301 from the box 13 (step S614).

Next, the controller 100 generates a print image from the image data based on the print settings (step S615). Then, the controller 100 generates a real-size preview image from the print image according to the preview setting instruction (step S616). The controller 100 displays the real-size preview image on the operation panel 110 (step S617).

Then, the controller 100 determines whether or not the OK key 504 on the preview image display screen shown in FIGS. 6A and 6B has been pressed, for terminating the real-size preview display (step S618). If the OK key 504 has not been pressed (NO to the step S618), the controller 100 returns to the step S617 to continue the display of the real-size preview image. If the OK key 504 has been pressed (YES to the step S618), the controller 100 terminates the present process.

As described above, although the real-size preview key 211 is displayed when the aggregation printing has been set, the real-size preview key 211 is displayed not only when the aggregation printing has been set, but also when a print setting has been made which involves setting of magnification, such as poster printing setting, i.e. a print setting which has an effect on the size of an image when the image is printed.

On the other hand, in the image forming apparatus shown in FIG. 1, it is possible to perform a so-called image synthesis process for printing e.g. a so-called stamp image or a form image, registered in advance, in a state synthesized with image data.

In a form synthesis process, character part of image data and a stamp image or a form image are sometimes printed in an overlapped state. This sometimes results in a printout including character part difficult to read, i.e. a result not intended by the user.

Therefore, the real-size preview display may be executed not only when a print setting has been made which has an effect on the size of characters of a printed image, but also when a print setting has been made which designates execution of the image synthesis process.

Figure 8:
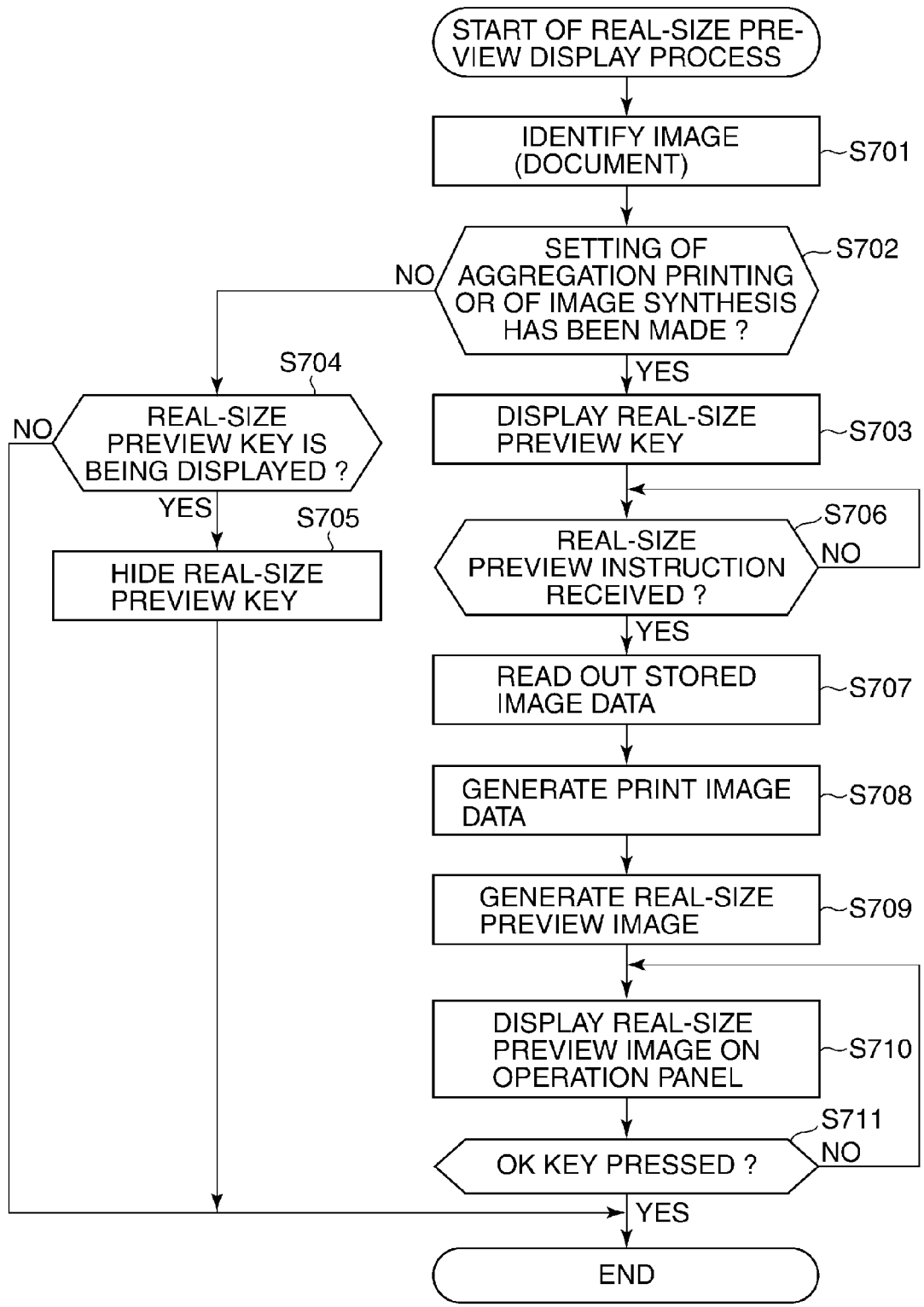
FIG. 8 is a flowchart of another variation of the real-size preview display process executed during an image synthesis process by the image forming apparatus.

FIG. 8 is a flowchart of another variation of the real-size preview display process described hereinbefore with reference to FIG. 4. This variation is executed by the image forming apparatus shown in FIG. 1, when executing printing of image data after executing the image synthesis process. Steps in FIG. 8 are executed according to a program which is stored in the memory, such as the ROM 107 or the HDD 108, and is executed by the CPU 105 included in the controller 100 of the image forming apparatus.

First, when the print key 203 has been pressed on the box data selection screen 301, the controller 100 identifies image data (e.g. a document) selected on the selection screen 301 (step S701). Then, the controller 100 determines whether or not the setting of aggregation printing or the setting of image synthesis has been made (step S702).

If the setting of aggregation printing or the setting of image synthesis has been made (YES to the step S702), the controller 100 displays the real-size preview key 211 on the FIG. 3B print execution screen 302 displayed on the operation panel 110 (step S703). On the other hand, if neither the setting of aggregation printing nor the setting of image synthesis has been made (NO to the step S702), the controller 100 determines whether or not the real-size preview key 211 is already being displayed on the operation panel 110 (step S704).

If the real-size preview key 211 is already being displayed (YES to the step S704), the controller 100 hides the real-size preview key 211 (step S705), followed by terminating the present process. On the other hand, if the real-size preview key 211 is not being displayed (NO to the step S704), the controller 100 immediately terminates the present process.

After execution of the step S703, The controller 100 determines whether or not a real-size preview instruction has been received, i.e. whether or not the real-size preview key 211 has been pressed (step S706).

If a real-size preview instruction has not been received (NO to the step S706), the controller 100 waits. On the other hand, if a real-size preview instruction has been received (YES to the step S706), the controller 100 reads out the image data designated by the real-size preview instruction, i.e. the image data selected on the box data selection screen 301 from the box 13 (step S707).

Next, the controller 100 generates a print image from the image data based on the print settings (step S708). Then, the controller 100 generates a real-size preview image from the print image according to the preview setting instruction (step S709). The controller 100 displays the real-size preview image on the operation panel 110 (step S710).

Next, the controller 100 determines whether or not the OK key 504 on the preview image display screen shown in FIGS. 6A and 6B has been pressed, for terminating the real-size preview display (step S711). If the OK key 504 has not been pressed (NO to the step S711), the controller 100 returns to the step S710 to continue the display of the real-size preview image. If the OK key 504 has been pressed (YES to the step S711), the controller 100 terminates the present process.

As described above, according to the embodiment of the present invention, the real-size preview display is executed, whereby it is possible to check a result of printing in advance before execution of the printing. As a result, the user can configure the print settings while easily grasping an image of a print product to be output. That is, it is possible to easily prevent a problem that characters and the like on a print product are different from those intended by the user.

Further, as for image data (e.g. a document) for which a print setting for reducing the size of characters has been made, the user is prompted to confirm an image thereof via the real-size preview display. This makes it possible to prevent occurrence of a print error due to difference in the sizes of characters and graphics from those intended by the user.

Thus, in the embodiment of the present invention, it is possible to not only execute preview without getting stressed, e.g. when executing aggregation printing, but also prevent a print error before printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Application No. 2011-235878, filed Oct. 27, 2011, which is hereby incorporated by reference herein in its entirety.

What is claimed is:

1. An image forming apparatus that performs image formation on a recording sheet according to image data, comprising:
a selecting unit configured to select image data to be used for the image formation;
a preview display control unit configured to control displaying an image to be formed on the recording sheet in the same size as when printed thereon, as a real-size preview image, before executing the image formation on the recording sheet according to the image data selected by said selecting unit; and
an operation key control unit configured to control an operation key to be operable or not to be operable, wherein when the operation key has been operated, said preview display control unit is configured to control displaying the real-size preview image;
wherein said operation key control unit is configured to control the operation key to be operable, when predetermined processing has been executed to the image data selected by said selecting unit.

2. The image forming apparatus according to claim 1, wherein said preview display control unit includes an enlargement key display unit configured to display an enlargement key for enlarging an image during preview,
wherein when the enlargement key has been operated, said preview display control unit compares a size of the real-size preview image with a size of a preview image having a predetermined size and generated according to the image data, and displays one of the real-size preview image and the preview image according to a result of comparison.

3. The image forming apparatus according to claim 1, wherein said preview display control unit includes a reduction key display unit configured to display a reduction key for reducing an image during preview,
wherein when the reduction key has been operated, said preview display control unit compares a size of the real-size preview image with a size of a preview image having a predetermined size and generated according to the image data, and displays one of the real-size preview image and the preview image according to a result of comparison.

4. The image forming apparatus according to claim 1 further comprising a storage unit configured to store image data on which the predetermined processing has been performed, as processed image data, with attribute information added thereto which indicates that the predetermined processing has been performed on the image data, and
wherein if the attribute information has been added to the image data selected by said selecting unit, said operation key control unit is configured to control the operation key to be operable.

5. The image forming apparatus according to claim 4, wherein said operation key control unit is configured to control the operation key to be operable,
if the image data selected by said selecting unit has the attribute information added thereto even when the predetermined processing has not been executed to the selected image data after being selected by said selecting unit.

6. The image forming apparatus according to claim 1, wherein the predetermined processing includes at least one of magnification processing for changing magnification of the image data, aggregation processing for processing the image data such that a plurality of pages are collected into one page, and synthesis processing for synthesizing an image set in advance and the image data.

7. The image forming apparatus according to claim 1 wherein said operation key control unit is configured to control the operation key not to be operable, when the predetermined processing has not been executed to the image data selected by said selecting unit.

8. A method of controlling an image forming apparatus that performs image formation on a recording sheet according to image data, comprising:
  selecting image data to be used for the image formation;
  displaying, an image to be formed on the recording sheet in the same size as when printed thereon, as a real-size preview image, on a display section, before executing the image formation on the recording sheet according to the selected image data; and
  controlling an operation key to be operable or not to be operable, wherein when the operation key has been operated, said real-size preview image is displayed;
  wherein the operation key is controlled to be operable, when predetermined processing has been executed to the selected image data.

9. A non-transitory computer-readable storage medium storing a computer-executable program for causing a computer to execute a method of controlling an image forming apparatus that performs image formation on a recording sheet according to image data,
  wherein the method comprises:
  selecting image data to be used for the image formation;
  displaying, an image to be formed on the recording sheet in the same size as when printed thereon, as a real-size preview image, on a display section, before executing the image formation on the recording sheet according to the selected image data; and
  controlling an operation key to be operable or not to be operable, wherein when the operation key has been operated, said real-size preview image is displayed;
  wherein the operation key is controlled to be operable, when predetermined processing has been executed to the selected image data.

* * * * *